United States Patent [19]
Summers et al.

[11] 3,808,534
[45] Apr. 30, 1974

[54] INTRINSICALLY POWERED ELECTRONIC MONITOR FOR FUEL CELLS

[75] Inventors: Warren S. Summers, Tolland; Francis G. Charest, East Hartford, both of Conn.

[73] Assignee: United Aircraft Corporation, East Hartford, Conn.

[22] Filed: Nov. 15, 1972

[21] Appl. No.: 306,647

[52] U.S. Cl............................. 340/249, 340/248 A
[51] Int. Cl. .......................................... G08b 21/00
[58] Field of Search .......... 340/249, 248 A; 320/39, 320/48; 328/148

[56] References Cited
UNITED STATES PATENTS
3,454,787  7/1969  Gelernter.................... 340/248 A X Primary Examiner—John W. Caldwell
Assistant Examiner—Daniel Myer
Attorney, Agent, or Firm—Donald F. Bradley

[57] ABSTRACT

A fuel cell monitor compares the voltages produced by each of a series of fuel cell stacks in order to monitor their outputs. If a malfunction occurs in any cell within a stack such as a short circuit or a cell becoming negative, the output voltage from that stack is reduced, and the monitor gives a warning or shuts down the entire series of fuel cells. The monitor is powered by the cell stacks or by an inverter which is connected to the fuel cells. In one embodiment the monitor indicates which of the fuel cell stacks is malfunctioning and maintains the indication until manually reset. Any number of stacks may be monitored by the fuel cell monitor described herein.

5 Claims, 2 Drawing Figures

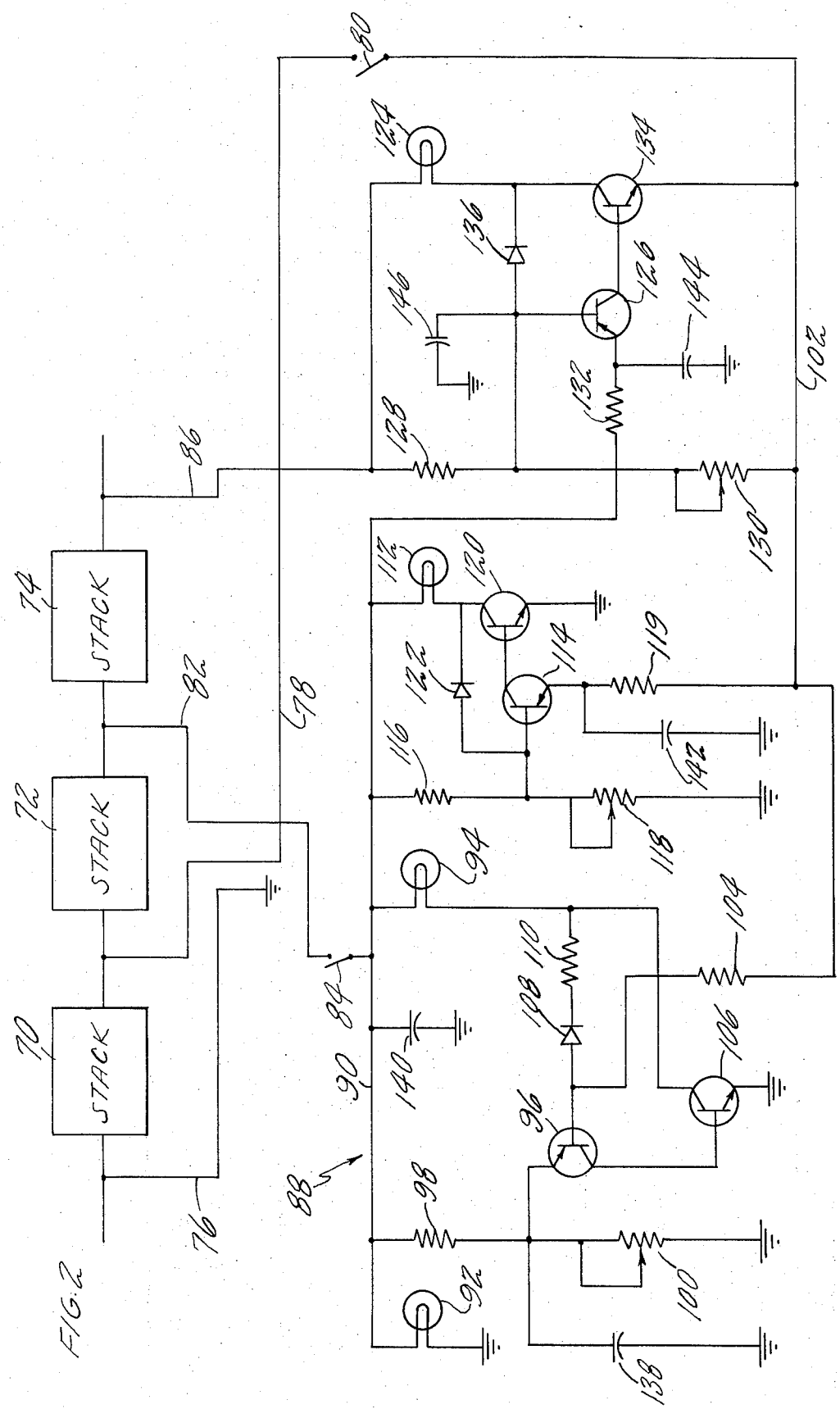

INTRINSICALLY POWERED ELECTRONIC MONITOR FOR FUEL CELLS

BACKGROUND OF THE INVENTION

1. Field of the Invention

This invention relates to fuel cells and particularly to apparatus for determining the occurrence of a malfunction in one or more of a plurality of fuel cells arrayed in a fuel cell stack. Specifically, the voltage from one of a plurality of fuel cell stacks connected in series is monitored and compared with the voltage output from an adjacent fuel cell stack. Any deviation between the two voltages above a predetermined magnitude is indicative of a malfunction, such as one cell going negative, and corrective action is initiated.

2. Description of the Prior Art

Monitors for batteries or other types of voltage generators which indicate that a malfunction has occurred in the operation of one or more cells are well known in the art. Generally these monitors take the form of a comparator in which the cell output voltage is compared with a fixed reference, and any difference above a predetermined magnitude will actuate an indicator. However, this type of monitor does not take into account normal changes in output voltage caused by aging of the fuel cells or variations in the fuel flow, and often provides erroneous error indications. Mechanical switching means connecting a sensor circuit to individual cells have also been used, but these latter systems are unreliable in that moving parts carrying electrical currents are employed.

One of the significant problems in the operation of fuel cells in typical load applications is that individual cells occasionally drop excessively in voltage or even reverse in polarity because of internal functional faults. Since a reversal may cause serious damage to the fuel cell stack, it is desirable to have a simple and effective means for providing an immediate indication of such failure so that appropriate action may be taken.

The present invention provides a unique fuel cell monitor in which the voltage output from a fuel cell stack is compared with the voltage output from an adjacent fuel cell stack, with any voltage difference therebetween being compared with a reference. If the difference exceeds a magnitude determined by the reference, the entire fuel cell stack may be automatically shut down and an alarm will indicate that a malfunction has occurred. By comparing the voltage outputs from stacks rather than individual fuel cells, minor voltage fluctuations which may occur in individual fuel cells can be ignored, but a major malfunction such as a voltage reversal will cause the voltage output from a stack to vary to such an extent that the monitor will become activated. In addition, in large fuel cell installations where a stack may contain a large number of individual fuel cells, it is uneconomical to monitor each cell, yet some indication of a serious malfunction is desirable.

SUMMARY OF THE INVENTION

In accordance with one embodiment of the present invention, there is provided a fuel cell monitor in which the voltage output from one stack containing a plurality of fuel cells is compared in a summing amplifier circuit with the voltage output from another stack having an equal number of fuel cells. The output from the summing amplifier is a voltage signal proportional to the difference between the two voltage outputs from the two fuel cell stacks. The difference signal is then compared with a reference voltage indicative of the maximum permissible voltage difference between the two fuel cell stacks. If the difference signal exceeds the magnitude of the reference voltage, an output signal is produced which is fed to a fuel cell shutdown circuit and/or an alarm. Any number of pairs of fuel cell stacks may be compared.

In accordance with another embodiment of the present invention, there is provided an electronic circuit in which the voltage outputs from three fuel cell stacks are compared with each other, and an indicator is actuated when the voltage output from one fuel cell stack differs from the voltage output of an adjacent fuel cell stack by more than a predetermined voltage.

Other features and advantages of the present invention will be evident from the following description of a preferred embodiment of the invention.

BRIEF DESCRIPTION OF THE DRAWINGS

FIG. 2 is a circuit schematic of a fuel cell monitor in which the voltage output from three fuel cell stacks is compared.

DESCRIPTION OF THE PREFERRED EMBODIMENT

Figure 1:
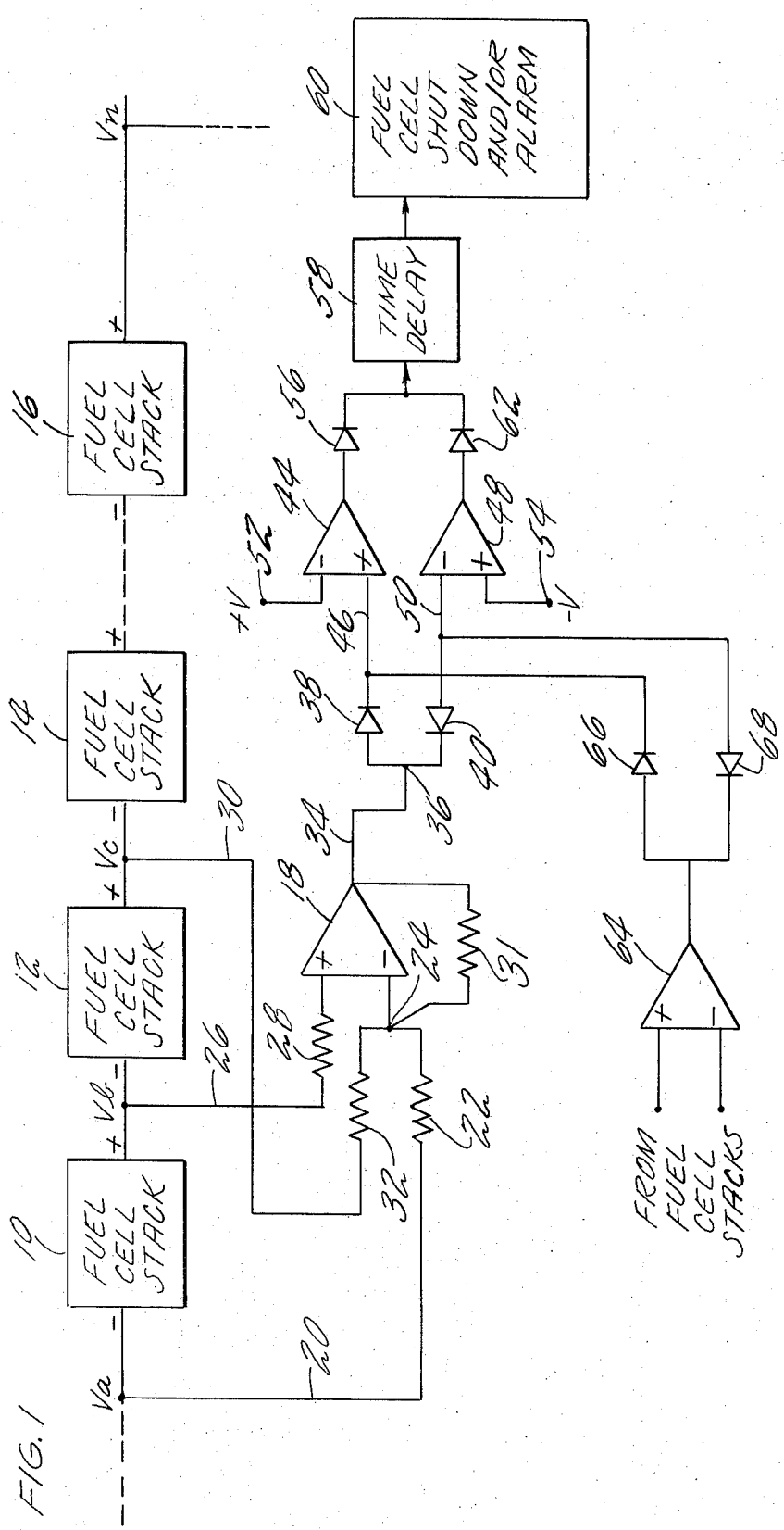
FIG. 1 is a circuit diagram partially in block diagram form of a fuel cell monitor in which the voltage outputs from any number of fuel cell stacks may be compared.

Referring now specifically to FIG. 1, there is shown a plurality of fuel cell stacks identified by reference numerals 10, 12, 14 and 16. Each fuel cell stack contains a plurality of individual fuel cells connected in series, each fuel cell stack having an identical number of fuel cells so that the output voltage produced by each fuel cell stack is substantially identical. Each fuel cell stack need not be completely independent of the other fuel cell stacks, but may be a portion of a larger stack. For example, in a given installation 100 fuel cells may be connected in series to form a large fuel cell stack. For purposes of the present invention, the large fuel cell stack may be electrically subdivided so as to result in four identical fuel cell stacks of 25 fuel cells each.

As shown in FIG. 1, the voltage output produced across each of two fuel cell stacks is scaled and fed to an operational amplifier 18 used as a summing amplifier where the voltages are algebraically summed to produce a voltage proportional to the difference between the fuel cell stacks. The potential at the negative side of fuel cell stack 10, $V_a$, is scaled and then fed through signal line 20 and resistor 22 to junction 24 which is the inverting input to amplifier 18. The potential at the positive side of fuel cell stack 10, $V_b$, which is identical to the potential at the negative side of fuel cell stack 12, is scaled and then fed through signal line 26 and through resistor 28 to the noninverting input to amplifier 18. The potential at the positive side of fuel cell stack 12, $V_c$, is scaled and then fed through signal line 30 and resistor 32 to junction 24. A feedback resistor 31 is connected from the output of amplifier 18 to junction 24 at the inverting input to the amplifier. The output from the amplifier 18 is proportional to $V_c - 2V_b + V_a$ which is the voltage difference between stacks 10 and 12. The difference voltage may be positive or negative depending on the actual voltages across each stack. During ideal operation of the fuel cell stacks, the voltage output across fuel cell stack 10 will be equal to that across fuel cell stack 12 and the output from amplifier 18 will be zero. If the voltage output across either of the fuel stacks increases or decreases, the output from amplifier 18 will be a positive or negative voltage depending upon the direction and magnitude of the voltage output change in either or both of the fuel stacks 10 and 12. If for example the voltage output across fuel cell stack 10 increases, the output from amplifier 18 will become positive. If the voltage output across fuel cell stack 12 increases, the output from amplifier 18 will become negative.

The output voltage from amplifier 18 is fed through signal line 34 to junction 36. Connected to junction 36 are oppositely poled diodes 38 and 40. A positive voltage output from amplifier 18 will pass through diode 38, but will be blocked by diode 40. Conversely, a negative output from amplifier 18 will pass through diode 40, but will be blocked by diode 38.

If the output signal from amplifier 18 is positive, it passes through diode 38 and to the input of a comparator 44 by way of signal line 46. If the output voltage from amplifier 18 is negative, it passes through diode 40 and to the negative input of a comparator 48 by way of signal line 50. The negative input to comparator 44 is a voltage +V applied at junction 52. The positive input to comparator 48 is a voltage −V applied at junction 54. The purpose of comparators 44 and 48 is to compare the voltage output from amplifier 18, the magnitude of which is proportional to the difference between the voltage outputs across the fuel cell stacks 10 and 12, with a reference voltage which may be fixed or may be variable as a function of system parameters. If the voltage output from amplifier 18 exceeds the reference voltage, a malfunction is indicated and corrective action is taken. Referring to comparator 44, if the positive voltage on line 46 is greater than the positive voltage reference at terminal 52, a positive output will be produced from comparator 44 which passes through diode 56 and through a time delay network 58 to actuate a fuel cell shutdown and/or alarm 60. A negative output from comparator 44 produced when the voltage on line 46 is less than the voltage at terminal 52 will not pass through diode 56. Conversely, if the negative output voltage from amplifier 18 which appears on line 50 is greater in magnitude than the negative reference voltage at terminal 54, a positive output voltage will appear at the output of comparator 48 and will pass through diode 62 and through time delay 58 to the fuel cell shutdown and/or alarm 60. A negative voltage output from comparator 48 will not pass through diode 62.

Time delay 58 may be inserted for the purpose of preventing a temporary voltage difference between the fuel cell stacks which is greater than the allowable voltage difference as set by the reference voltages from actuating the fuel cell shutdown or alarm before the condition causing the voltage difference has an opportunity to correct itself in response to the normal system controls. Only a change in the output voltages from the fuel cell stacks which is above the allowable difference set by the reference voltages and which lasts for a predetermined time such as five minutes will pass through the time delay circuit 58. The fuel cell shutdown shown in block 60 may take the form of a solenoid which closes the valves which supply the necessary fuel and/or oxidizer to the fuel cells. In addition, any load which is powered by the fuel cell stacks may also be deactivated to prevent damage. The alarm function of block 60 may take any form such as an audible or visible alarm.

If more than two fuel cell stacks are to be monitored, an additional amplifier with its associated diodes may be connected into the original monitor circuitry to provide the required protection. Shown in FIG. 1 is a summing amplifier 64 which is connected to receive voltage outputs taken across additional fuel cell stacks (not shown). Amplifier 64 functions identically with amplifier 18 and produces a voltage output which is indicative of the magnitude of the difference in the voltages between the fuel cell stacks being monitored. The output from amplifier 64 is fed through diodes 66 and 68 which function identically with diodes 38 and 40. The output from diodes 66 and 68 is also fed through lines 46 and 50, respectively, to the inputs to comparators 44 and 48. The diodes 38, 40, 66 and 68 operate in the fashion of an OR network in that only the largest in magnitude of the signals of the appropriate polarity will appear on lines 46 or 50.

It is apparent that additional fuel cell stacks may be monitored in a manner similar to that shown in FIG. 1 without the necessity of duplicating the comparators 44 and 48, or the time delay and fuel cell shutdown and alarm 60.

Referring now to FIG. 2, there is shown a fuel cell monitor circuit designed to monitor the voltages of three fuel cell stacks connected in series and to provide an indication by means of a pilot lamp when a cell within any cell stack becomes negative, or when there is more than, for example, one-half volt difference between adjacent cell stacks. The fuel cell monitor is powered by the cell stacks and requires no other source of external power. Once an indicator lamp is activated, it remains on until the circuit of FIG. 2 is reset by operation of an on-off power switch even if the condition causing the low voltage in one of the stacks is corrected.

Cell stacks 70, 72 and 74 are shown connected in series in a manner similar to FIG. 1. The potential at the negative terminal of stack 70 is fed through line 76 to a grounded or common terminal. The potential at the positive side of stack 70, which is identical to that of the negative side of stack 72, provides an input to circuit 88 through line 78 and switch 80. The potential at the positive side of stack 72, which is identical to the potential at the negative side of stack 74, is also fed as an input to circuit 88 through line 82 and switch 84. The potential at the positive side of stack 74 is fed as an input to circuit 88 through line 86. For purposes of illustration, it will be assumed that each of the stacks 70, 72 and 74 contains 11 fuel cells which produce one volt each, and that the voltage on lines 76, 78, 82 and 86, respectively, will be zero volts, 11 volts, 22 volts and 33 volts during ideal operation.

Circuit 88 is operated by closing switches 80 and 84 which may be ganged together. When the switches are closed and the circuit 88 is energized, a pilot lamp 92 will be turned on to indicate that the unit is operating by virtue of the 22 volt potential provided by line 82 through switch 84 and line 90.

The voltage output across fuel cell stack 70 is compared with the voltage output across fuel cell stack 72, and a pilot lamp 94 is turned on if the voltage across stack 70 is one-half volt or more lower than the voltage across stack 72. The emitter voltage for transistor 96 is determined by the voltage at the midpoint of a voltage divider network comprising resistors 98 and 100 connected between the 22 volt line 90 and ground. Resistor 100 is adjustable so that the emitter voltage of the transistor 96 may be varied. The voltage on signal line 90 is the same voltage which appears on signal line 82 at the positive terminal of stack 72. The voltage between stacks 70 and 72, normally 11 volts, is fed through line 78 and switch 80 and through line 102 through resistor 104 to the base of transistor 96. When the voltage across stack 70 falls to some level less than the voltage across stack 72, transistor 96 conducts. The collector of transistor 96 is connected to the base of a transistor 106. The emitter of transistor 106 is grounded. When transistor 96 conducts, base current is fed into transistor 106, causing it to conduct and producing a current flow through pilot lamp 94 which is connected between the 22 volt signal line 90 and the collector of transistor 106. Consequently, the turning on of pilot lamp 94 indicates that the voltage across stack 70 is at least one-half volt lower than that across stack 72. At the same time, base current is drawn from transistor 96 and passes through a diode 108 and a resistor 110 latching transistors 96 and 106 in the on states. When transistor 106 conducts, its collector voltage falls to a low level permitting the current flow through the diode 108 and the resistor 110. This current flow will maintain the transistor 96 in the on condition until the switches 84 and 80 are turned off to reset the circuit 88. The voltage level at which transistor 96 conducts can be varied by adjusting the variable resistor 100.

If the voltage output across stack 72 is one-half volt or more lower than that across stack 70, a pilot lamp 112 is turned on. The base of a transistor 114 is connected to the midpoint of a voltage divider comprising resistors 116 and 118 connected between the 22 volt line 90 and ground. Resistor 118 is adjustable to vary the base voltage of transistor 114. The emitter of transistor 114 is connected to the 11 volt line 102 through a resistor 119. The base-emitter junction of the transistor 114 acts as the comparison element, switching on the transistor 114 if the voltage across stack 72 fed to the base of the transistor is at least one-half volt less than the voltage across stack 70 fed to the emitter of transistor 114. When transistor 114 conducts, collector current flows through the collector of transistor 114 into the base of a transistor 120. The emitter of transistor 120 is grounded and the collector of transistor 120 is connected to the 22 volt line 90 through the pilot lamp 112. The conduction of base current into transistor 120 turns this transistor on, causing a current flow through pilot lamp 112. At the same time, current also flows from the base of transistor 114 through a diode 122 connected to the collector of transistor 120. The diode current maintains transistor 114 in the on state until the switches 80 and 84 are activated.

The voltage output across stack 74 is compared with that across stack 72, and a pilot lamp 124 is turned on if the voltage across stack 74 is at least one-half volt below the output voltage across stack 72. The base of a transistor 126 is biased by the voltage at the midpoint of the voltage divider comprising resistor 128 and a variable resistor 130 which are connected between the 33 volt output from the positive side of stack 74 which appears on line 86, and the 11 volt signal line 102. The 22 volt signal appearing on line 90 is fed through a resistor 132 to the emitter of transistor 126. If the base voltage of the transistor 126 is at least one-half volt less than the emitter voltage, transistor 126 conducts and collector current flows from the collector transistor 126 into the base of transistor 134. The emitter of transistor 134 is connected to the 11 volt line 102, and the collector is connected through pilot lamp 124 to the 33 volt line 86. The flow of base current into transistor 134 turns this transistor on, and pilot lamp 124 is activated. Base current from transistor 126 flowing through diode 136 into the collector of transistor 134 maintains transistor 126 in the on state until the switches 80 and 84 are turned off.

Capacitors 138, 140, 142, 144 and 146 are in the circuit to prevent erroneous latch-ups of the circuits which will produce false low stack indications when power switches 80 and 84 are turned on before conditions in the circuit 88 are stabilized.

As indicated previously, the circuit 88 does not reset itself once a low stack voltage condition is sensed, but the pilot lamps remain on to indicate which of the stacks 70, 72 or 74 is low until the power switches 80 and 84 are turned off.

The circuit of FIG. 2 may be expanded to monitor any number of fuel cell stacks, but the circuit of FIG. 1 is preferred when the outputs from a large number of stacks are to be monitored. The circuit of FIG. 1 may also be powered by the fuel cell voltages as is the circuit of FIG. 2.

It will be apparent that numerous changes and modifications may be made to the circuits of FIGS. 1 and 2 without departing from the scope of the invention as hereinafter claimed.

We claim:

1. A monitor for a plurality of fuel cell stacks, each said fuel cell stack comprising a plurality of series connected fuel cells, each said fuel cell stack being connected electrically in series with the other said fuel cell stacks, each of said fuel cell stacks generating an output voltage which is substantially equal to the output voltage produced by the other said fuel cell stacks during normal operation, comprising a summing amplifier having first and second input terminals and an output terminal, means connecting to said first input terminal the negative terminal of one of said fuel cell stacks and having a voltage $V_a$ and the positive terminal of a second fuel cell stack immediately adjacent to said one fuel cell stack and having a voltage $V_c$, means connecting to said second input terminal the voltage $V_b$ produced at the junction of the positive terminal of said one fuel cell stack and the negative terminal of said second fuel cell stack, said summing amplifier producing at its output terminal a voltage proportional to $V_c - 2V_b + V_a$, comparator means for comparing the voltage at the output terminal of said summing amplifier with a reference voltage, and signal means actuated only when the voltage at the output terminal at said summing amplifier exceeds said reference voltage for signifying the occurrence of a malfunction in one of said fuel cell stacks.

2. A monitor as in claim 1 in which said comparator means includes a first comparator circuit having a pair of input terminals and an output terminal, a first source of reference voltage, means connecting said first reference voltage source to one of said first comparator circuit input terminals, means including a first series diode connecting the output terminal of said summing amplifier with the other said input terminal of said first comparator circuit, a second comparator circuit having a pair of input terminals and an output terminal, a second source of reference voltage, means connecting said second reference voltage source to one of said second comparator circuit input terminals, means including a second series diode reversed in direction from said first series diode connecting the output terminal of said summing amplifier with the other said input terminal of said second comparator circuit, and means connecting the output terminals of first and second comparator circuits with said signal means.

3. A monitor as in claim 2 and including a series diode connected between the output terminal of each of said first and second comparator circuits and said signal means for passing a signal to actuate said signal means only when the voltage at the output terminal of said summing amplifier exceeds the reference voltage applied to one of said comparator circuits.

4. A monitor as in claim 1 and including time delay means connected between said comparator means and said signal means.

5. A monitor for a plurality of fuel cell stacks connected electrically in series, each said stack generating a substantially equal output voltage during normal operation, comprising a summing amplifier circuit having a pair of input terminals, means feeding the voltages generated by first and second series connected fuel cell stacks to said summing amplifier circuit input terminals, the voltage at the common connection between said first and second fuel cell stacks being fed to one of said input terminals and the voltage at the noncommon side of both said fuel cell stacks being fed to the other said input terminal, the output produced by said summing amplifier circuit being a voltage proportional to the difference in the voltages generated by said first and second fuel cell stacks, means comparing said difference voltage with a reference voltage to produce an output signal when said difference voltage exceeds said reference voltage, and means responsive to said output signal for indicating the occurrence of a malfunction in one of said fuel cell stacks.

* * * * *